United States Patent [19]

Teracuhi et al.

[11] Patent Number: 5,330,335
[45] Date of Patent: Jul. 19, 1994

[54] HORIZONTALLY ORIENTED ROTARY MACHINE HAVING INTERNAL LUBICATION OIL PUMP

[75] Inventors: Kiyoshi Teracuhi, Isesaki; Akihiro Kawano, Maebashi; Hideaki Satoh, Isesaki; Norio Kitano, Fujioka; Yuji Yoshii, Takasaki, all of Japan

[73] Assignee: Sanden Corporation, Gunma, Japan

[21] Appl. No.: 921,322

[22] Filed: Jul. 29, 1992

[30] Foreign Application Priority Data

Jul. 31, 1991 [JP] Japan .......................... 3-067317[U]
Jul. 31, 1991 [JP] Japan .......................... 3-067318[U]

[51] Int. Cl.$^5$ .......................... F01C 1/04; F01C 21/04; F01M 1/02; F01M 11/00
[52] U.S. Cl. .......................... 418/55.6; 418/88; 418/171; 184/6.16; 184/13.1
[58] Field of Search .......................... 418/55.6, 88, 166, 171; 184/6.16, 6.27, 13.1

[56] References Cited

U.S. PATENT DOCUMENTS

| | | | |
|---|---|---|---|
| 1,191,217 | 7/1916 | Oderman | 184/6.27 |
| 1,437,927 | 12/1922 | Brockway | 184/6.27 |
| 2,992,769 | 7/1961 | Manzanera | 418/88 |
| 3,135,460 | 6/1964 | Galin | 418/88 |
| 3,317,123 | 9/1965 | Funke | 417/363 |
| 3,833,318 | 9/1974 | Nakayama et al. | 418/100 |
| 3,865,515 | 2/1975 | Allen | 417/283 |
| 3,877,853 | 4/1975 | Harlin | 418/88 |
| 3,899,271 | 8/1975 | Glanvall | 418/82 |
| 3,986,799 | 10/1976 | McCullough | 418/56 |
| 4,005,948 | 2/1977 | Hiraga et al. | 184/6.17 |
| 4,314,796 | 2/1982 | Terauchi | 417/294 |
| 4,332,535 | 6/1982 | Terauchi et al. | 418/94 |
| 4,340,339 | 7/1982 | Hiraga et al. | 418/88 |
| 4,343,599 | 8/1982 | Kousokabe | 418/88 |
| 4,564,339 | 1/1986 | Nakamura et al. | 417/366 |
| 4,666,381 | 5/1987 | Butterworth | 418/88 |
| 4,917,582 | 4/1990 | Fraser, Jr. et al. | 418/55.6 |
| 4,936,756 | 6/1990 | Shimizu et al. | 417/371 |
| 4,938,991 | 9/1990 | Kikuchi | 418/55.6 |
| 4,968,232 | 11/1990 | Kikuchi | 418/55.5 |
| 5,000,669 | 3/1991 | Shimizu et al. | 418/55.6 |

FOREIGN PATENT DOCUMENTS

| | | | |
|---|---|---|---|
| 141052 | 3/1935 | Austria . | |
| 58-133495 | 8/1983 | Japan | 418/88 |
| 59-60092 | 4/1984 | Japan | 418/55.6 |
| 60-093192 | 5/1985 | Japan . | |
| 61-087994 | 5/1986 | Japan . | |
| 61-212689 | 9/1986 | Japan . | |
| 2-45686 | 2/1990 | Japan | 418/55.6 |

*Primary Examiner*—John J. Vrablik
*Attorney, Agent, or Firm*—Baker & Botts

[57] ABSTRACT

A rotary machine, such as a horizontally oriented scroll type refrigerant compressor is disclosed. The compressor includes a compressor housing, an inner block fixedly disposed within the compressor housing, a drive shaft extending substantially in the horizontal direction, and a driven mechanism, such as a compression mechanism operatively connected to one end of the drive shaft. The drive shaft is rotatably supported by the inner block and the compressor housing. A shielding element, such as an annular cylindrical member is fixedly held between the inner block and the compressor housing to prevent the drive shaft from passing through an oil sump of the housing. An internal lubrication oil pump is formed by the elements which are associated with the drive shaft, and is operated by virtue of the rotational motion of the drive shaft in order to supply the lubrication oil from the oil sump to the frictional surfaces of the internal component parts of the compressor. According to the construction and operational manner of the oil pump, the oil pump can be used for various types of horizontally oriented rotary machines. The drive shaft can also rotate without receiving oil viscous drag.

9 Claims, 3 Drawing Sheets

HORIZONTALLY ORIENTED ROTARY MACHINE HAVING INTERNAL LUBICATION OIL PUMP

BACKGROUND OF THE INVENTION

1. Technical Field

The present invention relates to a rotary machine, and more particularly, to a horizontally oriented rotary machine having an internal lubrication oil pump.

2. Description of the Prior Art

A rotary machine, such as a scroll type refrigerant compressor, which is horizontally oriented is disclosed in U.S. Pat. No. 4,917,582 issued to Fraser, Jr. et al. In Fraser, the horizontally oriented scroll type refrigerant compressor includes an internal lubrication oil pump which functions to supply lubrication oil in an oil sump of a compressor casing to the frictional surfaces of the internal component parts of the compressor. The oil pump operates by virtue of the reciprocating motion of one component part of an Oldham coupling mechanism which is used for preventing the rotation of an orbiting scroll member.

In comparison with a vertically oriented scroll type refrigerant compressor having an internal lubrication oil pump as disclosed in Japanese Patent Application Publication No. 6-336076, the teaching of the Fraser patent can reduce the size of the compressor. In particular, the height of the compressor can be remarkably reduced.

However, the oil pump disclosed in the Fraser patent can not be applied to scroll type refrigerant compressors having a non-Oldham coupling type rotation preventing mechanism (e.g., a ball coupling type rotation preventing mechanism) because the oil pump can only operate by virtue of the reciprocating motion of one component part of the Oldham coupling mechanism.

Furthermore, in the Fraser patent, one member which is rotatable with a drive shaft, such as a balancing weight which is fixedly connected to the drive shaft, may pass through the lubrication oil in the oil sump located at an inner bottom portion of the compressor casing when a level of the lubrication oil in the oil sump is excessively increased. This causes a defective torque fluctuation and ineffective operation of the drive shaft due to oil viscous drag.

SUMMARY OF THE INVENTION

Accordingly, it is an object of the present invention to provide an internal lubrication oil pump which can be used for various types of horizontally oriented rotary machines.

It is another object of the present invention to provide a horizontally oriented rotary machine in which a drive shaft can rotate without experiencing oil viscous drag.

According to the present invention, a rotary machine includes a housing, an inner block fixedly disposed within the housing so as to divide an inner hollow space of the housing into first and second portions, a drive shaft extending substantially in the horizontal direction, and a driven mechanism which is driven by the drive shaft. The drive shaft is rotatably supported by the inner block and one part of the housing. The driven mechanism is disposed within the second portion of the inner hollow space of the housing and is operatively connected to one end of the drive shaft.

The rotary machine further includes a pumping mechanism which pumps a lubrication liquid in a lower region of the first portion of the inner hollow space of the housing. The pumping mechanism is associated with the drive shaft so as to be operated by virtue of a rotational motion of the drive shaft.

The rotary machine further includes a shielding element which is held between the inner block and one part of the housing to shield the drive shaft from the lubrication liquid in the lower region of the first portion of the inner hollow space of the casing.

DETAILED DESCRIPTION OF THE PREFERRED EMBODIMENTS

Figure 1:
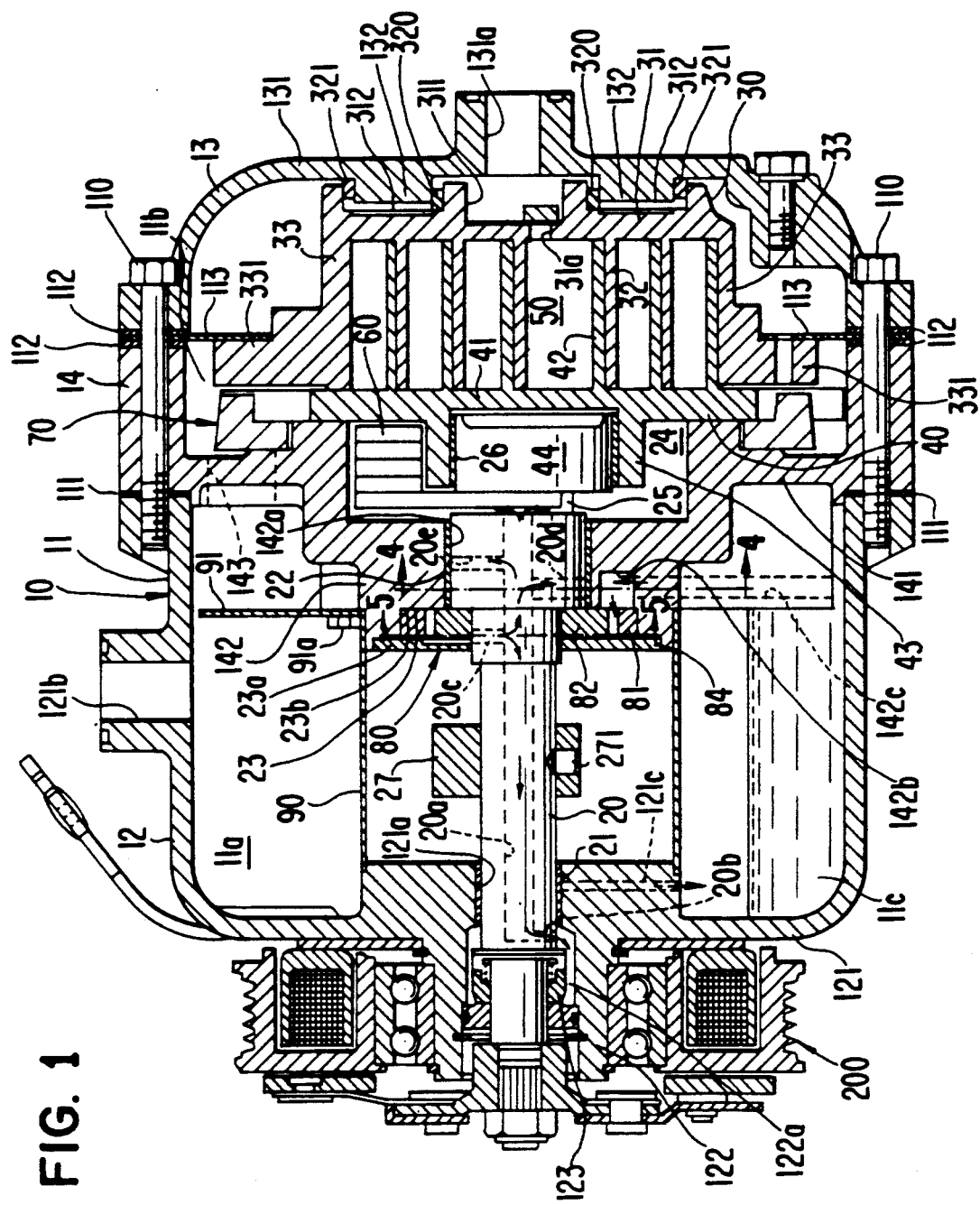
FIG. 1 is a longitudinal sectional view of a scroll type refrigerant compressor in accordance with one embodiment of the present invention.

FIG. 1 illustrates an overall construction of a horizontally oriented scroll type refrigerant compressor. For purposes of explanation only, the left side of the Figure will be referenced as the forward or front end and the right side of the Figure will be referenced as the rearward or rear end.

With reference to FIG. 1, horizontally oriented scroll type refrigerant compressor 10 includes a compressor casing 11 having a first cup-shaped portion 12, a second cup-shaped portion 13 and a cylindrical portion 14 disposed between first and second cup-shaped portions 12 and 13. An open end of first cup-shaped portion 12 is fixedly attached to an open end of second cup-shaped portion 13 by a plurality of bolts 110 through cylindrical portion 14. Annular gasket 111 is sandwiched between the open end of the first cup-shaped portion 12 and the front end of the cylindrical portion 14 to seal the mating surfaces of the first cup-shaped portion 12 and the cylindrical portion 14. An outer peripheral portion of an annular member 113 is sandwiched between a pair of annular gaskets 112. Annular member 113 is made of an elastic material, for example, spring steel. The pair of annular gaskets 112 are sandwiched between the open end of the second cup-shaped portion 13 and the rearward end of the cylindrical portion 14 to seal the mating surfaces of the cylindrical portion 14, annular elastic member 113 and the second cup-shaped portion 13.

First cup-shaped portion 12 includes hole 121a centrally formed at a bottom region 121 thereof. Drive shaft 20 penetrates through hole 121a, and is rotatably supported by a plain bearing 21 fixedly disposed within hole 121a. Annular projection 122 extends forwardly from bottom region 121 of first cup-shaped portion 12, and surrounds an outer end portion of drive shaft 20.

Electromagnetic clutch 200, through which the rotating motion of an external drive source (not shown) is intermittently transmitted to drive shaft 20, is mounted on annular projection 122. Shaft seal cavity 122a is defined in annular projection 122 for disposing shaft seal mechanism 123 therewithin. First cup-shaped portion 12 is provided with inlet port 121b formed at a side wall thereof. Inlet port 121b links an inner hollow space of compressor casing 11 to an external element of a refrigeration circuit, for example, an evaporator (not shown) through a pipe member (not shown).

Inner block 141 is integral with an extends radially inwardly from a front end region of cylindrical portion 14. Cylindrical projection 142 is centrally formed at inner block 141, and includes opening 142a. An inner end of drive shaft 20 is rotatably supported by a plain bearing 22 which is fixedly disposed within opening 142a. First cup-shaped portion 12 and inner block 141 define first inner hollow space 11a. Second cup-shaped portion 13 and inner block 141 define second inner hollow space 11b. Hole 143 is formed through an upper portion of inner block 141 to link first inner hollow space 11a to second inner hollow space 11b.

Fixed and orbiting scroll members 30 and 40 are disposed within second inner hollow space 11b of compressor casing 11. Fixed scroll member 30 includes first circular end plate 31 and first spiral element or wrap 32 extending from a front end surface of first circular end plate 31. Orbiting scroll member 40 includes second circular end plate 41 and second spiral element or wrap 42 extending from a rear end surface of second circular end plate 41. First and second spiral elements 32 and 42 interfit with each other with an angular and a radial offset.

Second cup-shaped portion 13 is provided with outlet port 131a centrally formed at a bottom region 131 thereof. Axial annular projection 132 spacedly surrounding outlet port 131a is formed at an inner surface of bottom region 131 of second cup-shaped portion 13. Circular depression 311 is centrally formed at a rear end surface of first circular end plate 31 of fixed scroll member 30 to face outlet port 131a. Valved discharge port 31a is formed through first circular end plate 31 to link circular depression 311 to a central sealed-off fluid pocket 50 defined by the central region of fixed and orbiting scroll members 30 and 40. Annular depression 312 spacedly surrounding circular depression 311 is formed at the rearward end surface of first circular end plate 31 to receive axial annular projection 132 of the second cup-shaped portion 13 therewithin.

First annular rubber member 320 is compressedly disposed between the inner side surface of annular depression 312 and the inner peripheral surface of axial annular projection 132. Second annular rubber member 321 is compressedly disposed between the outer side surface of annular depression 312 and the outer peripheral surface of axial annular projection 132. First and second annular rubber members 320 and 321 seal the mating surfaces of annular depression 312 and axial annular projection 132 so that circular depression 311 defines a discharge chamber which is sealingly isolated from second inner hollow space 11b of compressor housing 11. Outlet port 131a links discharge chamber 311 to an external element of a refrigeration circuit, for example, a condenser (not shown) through a pipe member (not shown).

Annular wall 33 is formed at an outer peripheral portion of first circular end plate 31 so as to surround first and second spiral elements 32 and 42. Annular flange 331 radially extends from an outward surface of a front end portion of annular wall 33, and is fixedly attached to an inner peripheral portion of annular elastic member 113 by a plurality of bolts (not shown). According to the above-mentioned construction, fixed scroll member 30 is allowed to resiliently move in the axial direction within a small distance.

Front circular depression 23 is centrally formed at the front end surfaces of cylindrical projection 142. The axis of front circular depression 23 is radially offset with the axis of opening 142a in the horizontal direction. Front circular depression 23 includes a large diameter section 23a and a small diameter section 23b located rearward of large diameter section 23a. A rear circular depression 24 is centrally formed at the rear end surface of inner block 141. A first balancing weight 60 is disposed within rear circular depression 24 and is fixedly connected to a front portion of pin member 25 which is integral with and which axially extends from the inner end surface of drive shaft 20. The axis of pin member 25 is radially offset with the axis of drive shaft 20. Boss 43 is centrally formed at a front end surface of second circular end plate 41 opposite to second spiral element 42, and rotatably receives disc-shaped rotor 44 therewithin through a plain bearing 26. Disc-shaped rotor 44 is connected to pin member 25. Accordingly, orbiting scroll member 40 is operatively connected to drive shaft 20 through pin member 25, disc-shaped rotor 44 and plain bearing 26. Oldham coupling mechanism 70 is interposed between inner block 141 and second circular end plate 41 of orbiting scroll member 40. Oldham coupling mechanism 70 allows orbiting scroll 40 only to orbit during rotation of drive shaft 20.

A second balancing weight 27 is fixedly connected to drive shaft 20 by bolt 271 at a location between bottom region 121 of first cup-shaped portion 12 and inner block 141.

With reference also to FIGS. 4–7, circular plate 81 (FIG. 5) is snuggly disposed within small diameter section 23b of front circular depression 23, and includes a hole 81a centrally formed therethrough. An inner periphery of hole 81a is generally of a sinuous shape, thereby forming a plurality of teeth 81b. Cavity 142b, having an irregular curve-shaped cross section, is formed at cylindrical projection 142, and is linked to hole 81a of circular plate 81. Annular plate 82 which is fixedly mounted on drive shaft 20 by key-groove mechanism 83 is loosely disposed within hole 81a. An outer periphery of annular plate 82 is generally of a sinuous shape, thereby forming a plurality of teeth 82b. The number of teeth 81b of circular plate 81 is one greater than the number of teeth 82b of annular plate 82. In this embodiment, the number of teeth 81b of circular plate 81 is eight and the number of teeth 82b of annular plate 82 is seven.

A circular side plate 84 (FIGS. 6–7) is fixedly disposed within large diameter section 23a of front circular depression 23 by a plurality of securing bolts (not shown), and includes hole 84a through which drive shaft 20 closely passes. A depression 841 having an irregular curve-shaped cross section is formed at a rearward end surface of circular side plate 84. A lower part of depression 841 is linked to an upper part of hole 84a. Circular side plate 84 prevents the axial movement of circular plate 81 and annular plate 82. Circular plate 81 and annular plate 82 substantially form a trochoid-type pump mechanism 80. Circular plate 81 and annular plate 82 function as outer and inner rotors of trochoid type pump mechanism 80, respectively.

An axial hole 20a (FIGS. 4–5) is axially formed through drive shaft 20. Axial hole 20a extends from the inner end surface of drive shaft 20 to a position rearward of shaft seal mechanism 123 mounted about a front end portion of drive shaft 20. First, second, third and fourth radial holes 20b, 20c, 20d and 20e are radially formed through drive shaft 20. First radial hole 20b links a front end portion of axial hole 20a to shaft seal cavity 122a. Second radial hole 20c links axial hole 20a to depression 841 formed at the rear end surface of circular side plate 84. Third and fourth radial holes 20d and 20e link axial hole 20a to a gap created between plain bearing 22 and drive shaft 20.

First conduit 121c (FIG. 1) is formed in bottom region 121 of first cup-shaped portion 12 and plain bearing 21 to link a gap created between plain bearing 21 and drive shaft 20 to first inner hollow space 11a. Second conduit 142c is formed in the lower region of inner block 141 to link cavity 142b to oil sump 11c which occupies a lower portion of first inner hollow space 11a.

Figure 2:
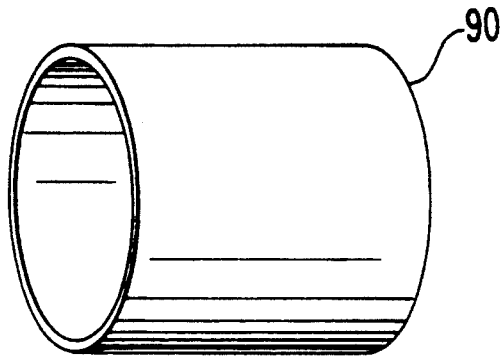
FIG. 2 is a perspective view of an annual cylindrical pipe member for spacedly surrounding a drive shaft of the scroll type refrigerant compressor shown in FIG. 1.

Annular cylindrical member 90 as shown in FIG. 2 is fixedly and hermetically held between bottom region 121 of first cup-shaped portion 12 and cylindrical projection 142 of inner block 141, and spacedly surrounds an intermediate portion of drive shaft 20 and second balancing weight 27. As a result, an invasion of the lubrication oil to an inner hollow space of annular cylindrical member 90 is prevented even when the level of the lubrication oil in oil sump 11c is excessively increased. Therefore, second balancing weight 27 rotates with drive shaft 20 without passing through the oil sump even when the level of the lubrication oil in oil sump 11c is excessively increased. Accordingly, drive shaft 20 can rotate without a defective torque fluctuation and ineffective operation thereof.

Figure 3:
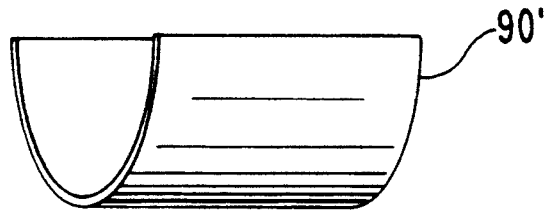
FIG. 3 is a perspective view of a semi-annular cylindrical pipe member which may replace the cylindrical pipe member shown in FIG. 2.
Figure 4:
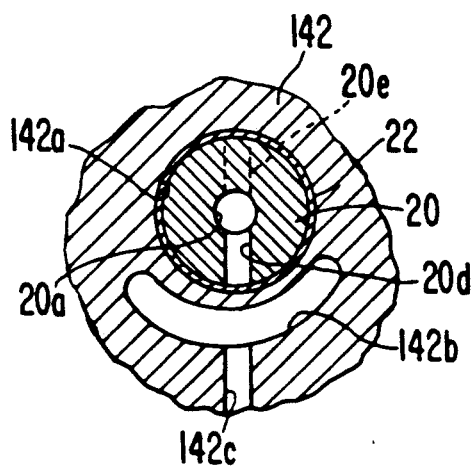
FIG. 4 is an enlarged cross-sectional view taken along line 4—4 of FIG. 1.
Figure 5:
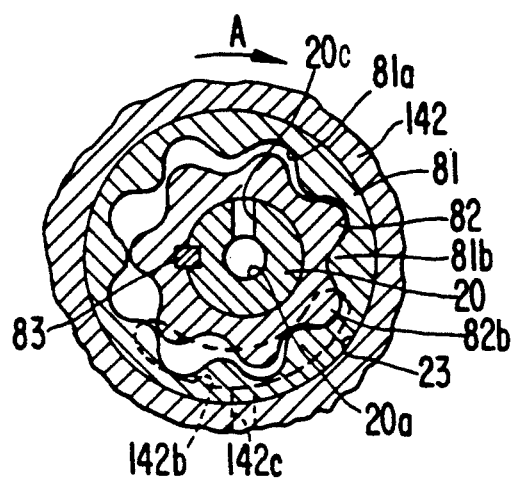
FIG. 5 is an enlarged cross-sectional view taken along line 5—5 of FIG. 1.
Figure 6:
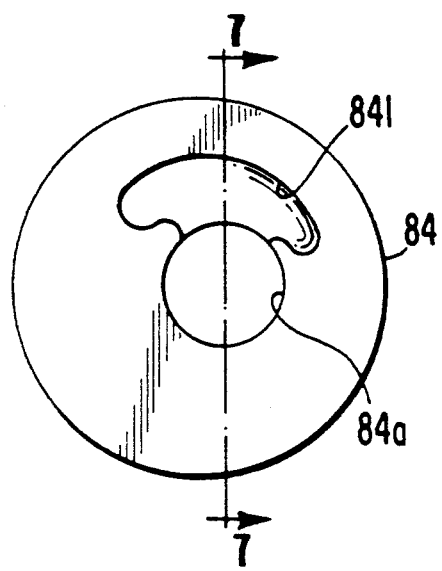
FIG. 6 is an enlarged side view of an annular plate which forms a part of a trochoid-type pump mechanism shown in FIG. 1.
Figure 7:
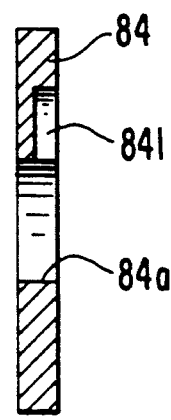
FIG. 7 is a cross-sectional view taken along line 7—7 of FIG. 6.

Alternatively, semi-annular cylindrical member 90' (FIG. 3) may be fixedly held between bottom region 121 of first cup-shaped portion 12 and cylindrical projection 142 of inner block 141 allowing an inner hollow space thereof to open upwardly, if the amount of lubrication oil in the refrigeration circuit is determined to be able to avoid causing the lubrication oil to overflow into the inner hollow space of semi-annular cylindrical member 90' in any operational condition of the refrigeration circuit.

Rectangular plate 91 is fixedly connected to the upper front end surface of cylindrical projection 142 of inner block 141 by a plurality of bolts 91a.

In the operation of compressor 10, the refrigerant gas flowing from the evaporator (not shown) flows into first inner hollow space 1a through inlet port 121b, and further flows to second inner hollow space 11b through hole 143. Rectangular plate 91 is located on a flow path of the refrigerant gas from first inner hollow space 11a to hole 143 so that the suspended lubrication oil mist in the refrigerant gas is effectively separated therefrom due to a collision with rectangular plate 91. The refrigerant gas flowing into second inner hollow space 11b is taken into the outermost located sealed-off fluid pockets between scroll member 30 and 40 via Oldham coupling mechanism 70, then moves toward the center of spiral elements 32 and 42 during the orbital motion of orbiting scroll 40 with a resultant volume reduction and compression, and is discharged to discharge chamber 311 through valved discharge port 31a. The discharged refrigerant gas in discharge chamber 311 then flows to the condenser (not shown) through outlet port 131a.

The operation of trochoid-type pump mechanism 80 is as follows. With reference to FIGS. 4–7 in addition to FIG. 1, when inner rotor 82 rotates with drive shaft 20 in the clockwise direction as shown by arrow "A" in FIG. 5, outer rotor 81 dependently rotates clockwise due to an engagement between a part of teeth 82b of inner rotor 82 with a part of teeth 81b of outer rotor 81. With reference to the arrows in FIG. 1, by virtue of the rotational motion of both inner and outer rotors 82 and 81, the lubrication oil is continuously pumped from oil sump 11c via second conduit 142c and cavity 142b, and is continuously discharged to depression 841 of circular side plate 84. The lubrication oil in depression 841 flows radially inwardly through second radial hole 20c overcoming the centrifugal force generated by the rotational motion of drive shaft 20, and then flows into axial hole 20a. The lubrication oil flowing into axial hole 20a flows through axial hole 20a in both the forward and rearward directions.

The lubrication oil flowing through axial hole 20a in the forward direction further flows into shaft seal cavity 122a through first radial hole 20b to lubricate the frictional surfaces of drive shaft 20 and shaft seal mechanism 123. The lubrication oil in shaft seal cavity 122a flows into the gap created between drive shaft 20 and plain bearing 21 to lubricate the frictional surfaces of drive shaft 20 and plain bearing 21, and further flows to the lower portion of first inner hollow space 11a through first conduit 121c to be joined to the lubrication oil in oil sump 11c.

On the other hand, the lubrication oil flowing through axial hole 20a in the rearward direction further flows into the gap created between the inner end portion of drive shaft 20 and plain bearing 22 through third and fourth radial holes 20d and 20e to lubricate the frictional surfaces of drive shaft 20 and plain bearing 22, and then flows out rear circular depression 24.

Furthermore, axial hole 20a may be extended to a rear end surface of disc-shaped rotor 44 to more effectively lubricate the frictional surfaces of plain bearing 26 and disc-shaped rotor 44.

As described above, the internal lubrication oil pump is formed by the elements which are associated with the drive shaft, and operates by virtue of the rotational motion of the drive shaft. According to the construction and operational manner, the internal lubrication oil pump can be used for various types of horizontally oriented rotary machine.

The present invention has been described in connection with the preferred embodiments. These embodiments, however, are merely example only and the present invention is not restricted thereto. It will be easily understood by those skilled in the art that variations and modifications can be easily made within the scope of the present invention as defined by the claims.

We claim:

1. In a rotary machine including a housing having an inner hollow space;
    an inner block fixedly disposed within said housing to divide said inner hollow space into first and second portions, wherein said inner block comprises a circular depression centrally formed at one end surface thereof opposite to said second portion of said inner hollow space of said housing, an axis of said circular depression being offset with an axis of said drive shaft, said circular depression including a small diameter portion and a large diameter portion which faces said first portion of said inner hollow space of said housing;

a trochoid-type pump operatively coupled with said drive shaft, such that rotational motion of said drive shaft causes said trochoid-type pump to pump a lubrication liquid stored in a lower region of said first portion of said inner hollow space, said trochoid-type pump comprising a first circular plate snugly disposed within said small diameter portion, said first circular plate including a hole having a periphery which is generally sine shaped to form a plurality of first teeth, a second circular plate including a first central hole through which said drive shaft passes, a key-groove mechanism fixedly connecting said drive shaft to said second circular plate, an outer periphery of said second circular plate is generally sine shaped to form a plurality of second teeth, a part of said second teeth engaging with a part of said first teeth to dependently rotate said first circular plate during rotation of said drive shaft and said second circular plate, and a third circular plate fixedly disposed within said large diameter portion of said circular depression to prevent axial movement of said first and second circular plates, said third circular plate including a second central hole through which said drive shaft closely passes;

a drive shaft disposed within at least said first portion and extending substantially in the horizontal direction, said drive shaft being rotatably supported by said inner block and a part of said housing; and a driven mechanism driven by said drive shaft, said driven mechanism being disposed within said second portion of said inner hollow space and being operatively connected to one end of said drive shaft.

2. The rotary machine of claim 1, said driven mechanism comprising a fixed scroll, an orbiting scroll operatively associated with said fixed scroll, and a rotation prevention mechanism for preventing rotation of said orbiting scroll during rotational motion of said drive shaft, said orbiting scroll being operatively connected to one end of said drive shaft.

3. The rotary machine of claim 2, said rotation prevention mechanism comprising an Oldham coupling.

4. In a rotary machine including a housing having an inner hollow space;

an inner block fixedly disposed within said housing to divide said inner hollow space into first and second portions;

a drive shaft disposed within at least said first portion and extending substantially in the horizontal direction, said drive shaft being rotatably supported by said inner block and a part of said housing;

a driven mechanism driven by said drive shaft, said driven mechanism being disposed within said second portion of said inner hollow space and being operatively connected to one end of said drive shaft;

pumping means for pumping a lubrication liquid located in a lower region of said first portion of said inner hollow space of said housing; and shielding means for shielding said drive shaft from said lubrication liquid located in said lower region of said first portion of said inner hollow space of said housing, wherein said shielding means comprises a single annular cylindrical member having cylindrical inner and outer surfaces and fixedly and hermetically held between said inner block and said part of said housing and which spacedly surrounds said drive shaft.

5. The rotary machine of claim 4, said driven mechanism comprising a fixed scroll, an orbiting scroll operatively associated with said fixed scroll, and a rotation prevention mechanism for preventing rotation of said orbiting scroll during rotational motion of said drive shaft, said orbiting scroll being operatively connected to one end of said drive shaft.

6. The rotary machine of claim 5, said rotation prevention mechanism comprising an Oldham coupling.

7. In a rotary machine including a housing having an inner hollow space;

an inner block fixedly disposed within said housing to divide said inner hollow space into first and second portions;

a drive shaft disposed within at least said first portion and extending substantially in the horizontal direction, said drive shaft being rotatably supported by said inner block and a part of said housing;

a driven mechanism driven by said drive shaft, said driven mechanism being disposed within said second portion of said inner hollow space and being operatively connected to one end of said drive shaft;

pumping means for pumping a lubrication liquid located in a lower region of said first portion of said inner hollow space of said housing; and shielding means for shielding said drive shaft from said lubrication liquid located in said lower region of said first portion of said inner hollow space of said housing and preventing an exterior portion of said drive shaft from coming into contact with said lubrication liquid, wherein said shielding means comprises a semi-cylindrical member fixedly held between said inner block and said part of said housing to enable an inner hollow space thereof to open upwardly.

8. The rotary machine of claim 7, said driven mechanism comprising a fixed scroll, an orbiting scroll operatively associated with said fixed scroll, and a rotation prevention mechanism for preventing rotation of said orbiting scroll during rotational motion of said drive shaft, said orbiting scroll being operatively connected to one end of said drive shaft.

9. The rotary machine of claim 8, said rotation prevention mechanism comprising an Oldham coupling.

* * * * *